(12) United States Patent
Karmakar et al.

(10) Patent No.: US 8,044,828 B2
(45) Date of Patent: Oct. 25, 2011

(54) METHOD AND SYSTEM FOR ENCODING COMMUNICATIONS BETWEEN WIRELESS AND OTHER DEVICES

(75) Inventors: Srimantee Karmakar, Mississauga (CA); Bryan R. Goring, Milton (CA); Michael Shenfield, Richmond Hills (CA); Kamen B. Vitanov, Mississauga (CA); Jeffrey C. Rogers, Scarborough (CA)

(73) Assignee: Motorola Mobility, Inc., Libertyville, IL (US)

( * ) Notice: Subject to any disclaimer, the term of this patent is extended or adjusted under 35 U.S.C. 154(b) by 639 days.

(21) Appl. No.: 12/238,955

(22) Filed: Sep. 26, 2008

(65) Prior Publication Data
US 2009/0022094 A1    Jan. 22, 2009

Related U.S. Application Data

(63) Continuation of application No. 11/107,868, filed on Apr. 18, 2005, now Pat. No. 7,446,678.

(51) Int. Cl.
*H03M 7/00* (2006.01)
(52) U.S. Cl. .......................................... 341/50; 341/51
(58) Field of Classification Search .................... 341/50, 341/51; 370/474, 466, 389, 356, 230
See application file for complete search history.

(56) References Cited

U.S. PATENT DOCUMENTS

| 5,978,386 | A | 11/1999 | Hamalainen et al. |
| 6,134,245 | A | 10/2000 | Scarmalis |
| 6,195,739 | B1 * | 2/2001 | Wright et al. ................... 712/19 |
| 6,542,504 | B1 | 4/2003 | Mahler et al. |
| 6,678,246 | B1 | 1/2004 | Smyth |
| 6,693,899 | B1 | 2/2004 | Makridakis |
| 6,839,413 | B1 | 1/2005 | Brock et al. |
| 6,909,714 | B2 | 6/2005 | Abrol et al. |
| 6,950,862 | B1 | 9/2005 | Puthiyandyil et al. |

OTHER PUBLICATIONS

Avaro-France Telecom Basso-AT&T Casner-Packet Design Civanlar-AT&T Gentric-Philips Herpel-Thomson Lifshitz-Optibase Lim-mp4cast Perkins-ISI: "RTP Payload Format for MPEG-4 Streams" IETF Standard-Working-Draft, Internet Engineering Task Force, IETF, ch, No. 4 May 2001, XP015013573 ISSN: 0000-0004 chapters 3.5, 4, 4.1.

* cited by examiner

*Primary Examiner* — Jean Jeanglaude

(57) ABSTRACT

A method for encoding a message communicated between devices, the message having at least one field, the method comprising: if the field is not optional and contains a value, writing the value to one or more data bytes in a byte buffer; and, if the field is optional and contains a default value, marking a bit in a reserved byte in the byte buffer to indicate that the field contains a default value.

17 Claims, 7 Drawing Sheets

METHOD AND SYSTEM FOR ENCODING COMMUNICATIONS BETWEEN WIRELESS AND OTHER DEVICES

RELATED APPLICATIONS

The present application is a continuation of U.S. patent application Ser. No. 11/107,868, filed Apr. 18, 2005.

FIELD OF THE INVENTION

This invention relates to the field of wireless communications, and more specifically, to encoding communications between wireless and other devices.

BACKGROUND

Current wireless mobile communication devices include microprocessors, memory, soundcards, and run one or more software applications. Examples of software applications used in these wireless devices include micro-browsers, address books, email clients, instant messaging ("IM") clients, and wavetable instruments. Additionally, wireless devices have access to a plurality of services via the Internet. A wireless device may, for example, be used to browse web sites on the Internet, to transmit and receive graphics, and to execute streaming audio and/or video applications. The transfer of Internet content to and from wireless device is typically facilitated by the Wireless Application Protocol ("WAP"), which integrates the Internet and other networks with wireless network platforms.

With respect to wireless device communications, it is important to minimize the amount of data transmitted between the device and its base station or server. Currently, this minimization is typically performed by reducing the size (i.e., the number of bits) of each message sent between the device and server to the greatest extent possible.

A message communicated between a wireless device and a server typically contains primitive data types or primitives (e.g., boolean, integer, long, etc.). Beyond primitives, a message can also contain strings, complex objects, and arrays of primitives and objects. A complex object is an entity encapsulating one or more primitive or string fields, other complex objects, or arrays of these. All primitive and non-primitive fields of the message are serialized into a byte format recognizable to both the sender and receiver. A "compact" message is one in which a data compacting algorithm has been used to decrease the number of bits necessary to encode any data field. For example, an integer (i.e., "mint" in Java™) which is represented by 32 bits or 4 bytes can be encoded to use just 1 byte, depending on the value, with current techniques.

One shortcoming of these current techniques is that they are limited in the extent to which they can compact messages communicated between wireless and other devices.

A need therefore exists for an effective method and system for encoding communications between wireless and other devices. Accordingly, a solution that addresses, at least in part, the above and other shortcomings is desired.

SUMMARY

According to one aspect of the invention, there is provided a method for encoding a message communicated between devices, the message having at least one field, the method comprising: if the field is not optional and contains a value, writing the value to one or more data bytes in a byte buffer; and, if the field is optional and contains a default value, marking a bit in a reserved byte in the byte buffer to indicate that the field contains a default value.

Preferably, the method further includes, if the field is optional and contains a custom value, marking the bit in the reserved byte to indicate that the field contains a custom value and writing the custom value to one or more data bytes in the byte buffer.

In accordance with further aspects of the present invention there is provided an apparatus such as a data processing system or wireless device, a method for adapting this system or device, as well as articles of manufacture such as a computer readable medium having program instructions recorded thereon for practising the method of the invention.

BRIEF DESCRIPTION OF THE DRAWINGS

Further features and advantages of the embodiments of the present invention will become apparent from the following detailed description, taken in combination with the appended drawings, in which.

It will be noted that throughout the appended drawings, like features are identified by like reference numerals.

DETAILED DESCRIPTION OF THE PREFERRED EMBODIMENTS

The following detailed description of the embodiments of the present invention does not limit the implementation of the invention to any particular computer programming language. The present invention may be implemented in any computer programming language provided that the operating system ("OS") provides the facilities that may support the requirements of the present invention. A preferred embodiment is implemented in the JAVA™ computer programming language (or other computer programming languages such as C or C++). (JAVA and all JAVA-based trademarks are the trademarks of Sun Microsystems Corporation.) Any limitations presented would be a result of a particular type of operating system or computer programming language and would not be a limitation of the present invention.

Figure 1:
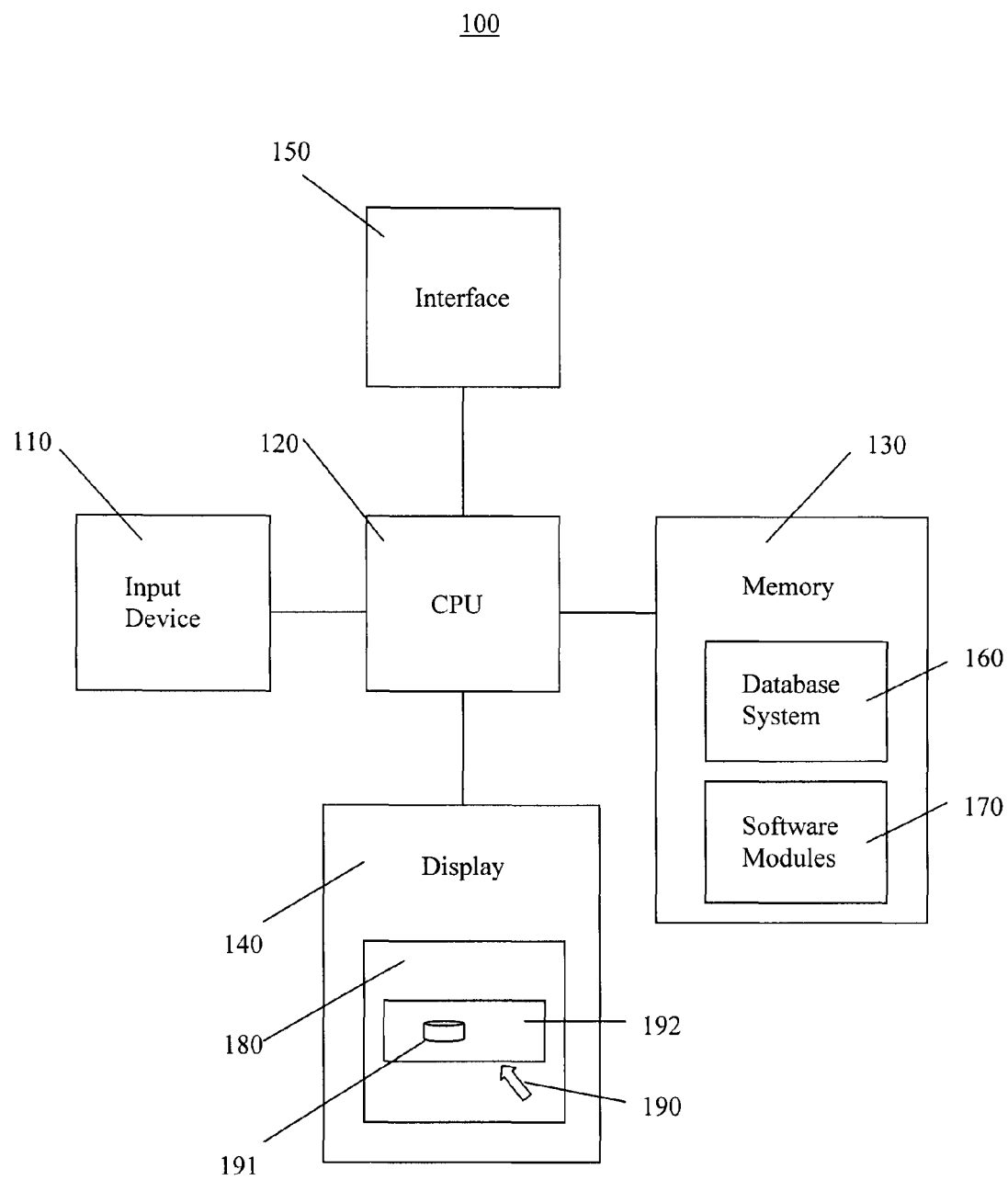
FIG. 1 is a block diagram illustrating a data processing system adapted for implementing an embodiment of the invention.

FIG. 1 is a block diagram illustrating a data processing system 100 adapted for implementing an embodiment of the invention. The data processing system 100 includes an input device 110, a central processing unit or CPU 120, memory 130, a display 140, and an interface 150. The input device 110 may include a keyboard, mouse, trackball, remote control, or similar device. The CPU 120 may include dedicated coprocessors and memory devices. The memory 130 may include RAM, ROM, or disk devices. The display 140 may include a computer screen, terminal device, or a hardcopy producing output device such as a printer or plotter. And, the interface 150 may include a network connection including an Internet connection and a wireless network 220 connection (see FIG. 2). The data processing system 100 is adapted for communicating with wireless devices 210 over a wireless network 220.

The data processing system 100 may be a server system or a personal computer ("PC") system. The CPU 120 of the system 100 is operatively coupled to memory 130 which stores an operating system (not shown), such as IBM Corporation's OS/2™, UNIX, etc., for general management of the system 100. The interface 150 may be used for communicating to external data processing systems (not shown) through a network (such as the Internet) or wireless network 220 (see FIG. 2). Examples of suitable platforms for the system 100 include iSeries™ servers and ThinkCentre™ personal computers available from IBM Corporation. The system 100 may include application server software (not shown), such as WebLogic® Server available from BEA Systems, Inc., for developing and managing distributed applications.

The data processing system 100 may include a database system 160 for storing and accessing programming information. The database system 160 may include a database management system ("DBMS") and a database and is stored in the memory 130 of the data processing system 100.

The data processing system 100 includes computer executable programmed instructions for directing the system 100 to implement the embodiments of the present invention. The programmed instructions may be embodied in one or more software modules 170 resident in the memory 130 of the data processing system 100. Alternatively, the programmed instructions may be embodied on a computer readable medium (such as a CD disk or floppy disk) which may be used for transporting the programmed instructions to the memory 130 of the data processing system 100. Alternatively, the programmed instructions may be embedded in a computer-readable, signal-bearing medium that is uploaded to a network by a vendor or supplier of the programmed instructions, and this signal-bearing medium may be downloaded through the interface 150 to the data processing system 100 from the network by end users or potential buyers.

The CPU 120 of the system 100 is typically coupled to one or more devices 110 for receiving user commands or queries and for displaying the results of these commands or queries to the user on a display 140. As mentioned, the memory 130 may include a variety of storage devices including internal memory and external mass storage typically arranged in a hierarchy of storage as understood to those skilled in the art.

A user may interact with the data processing system 100 and its software modules 170 using a graphical user interface ("GUI") 180. The GUI 180 may be web-based and may be used for monitoring, managing, and accessing the data processing system 100. GUIs are supported by common operating systems and provide a display format which enables a user to choose commands, execute application programs, manage computer files, and perform other functions by selecting pictorial representations known as icons, or items from a menu through use of an input or pointing device such as a mouse 110. In general, a GUI is used to convey information to and receive commands from users and generally includes a variety of GUI objects or controls, including icons, toolbars, drop-down menus, text, dialog boxes, buttons, and the like. A user typically interacts with a GUI 180 presented on a display 140 by using an input or pointing device (e.g., a mouse) 110 to position a pointer or cursor 190 over an object 191 and by "clicking" on the object 191.

Typically, a GUI based system presents application, system status, and other information to the user in "windows" appearing on the display 140. A window 192 is a more or less rectangular area within the display 140 in which a user may view an application or a document. Such a window 192 may be open, closed, displayed full screen, reduced to an icon, increased or reduced in size, or moved to different areas of the display 140. Multiple windows may be displayed simultaneously, such as: windows included within other windows, windows overlapping other windows, or windows tiled within the display area.

Figure 2:
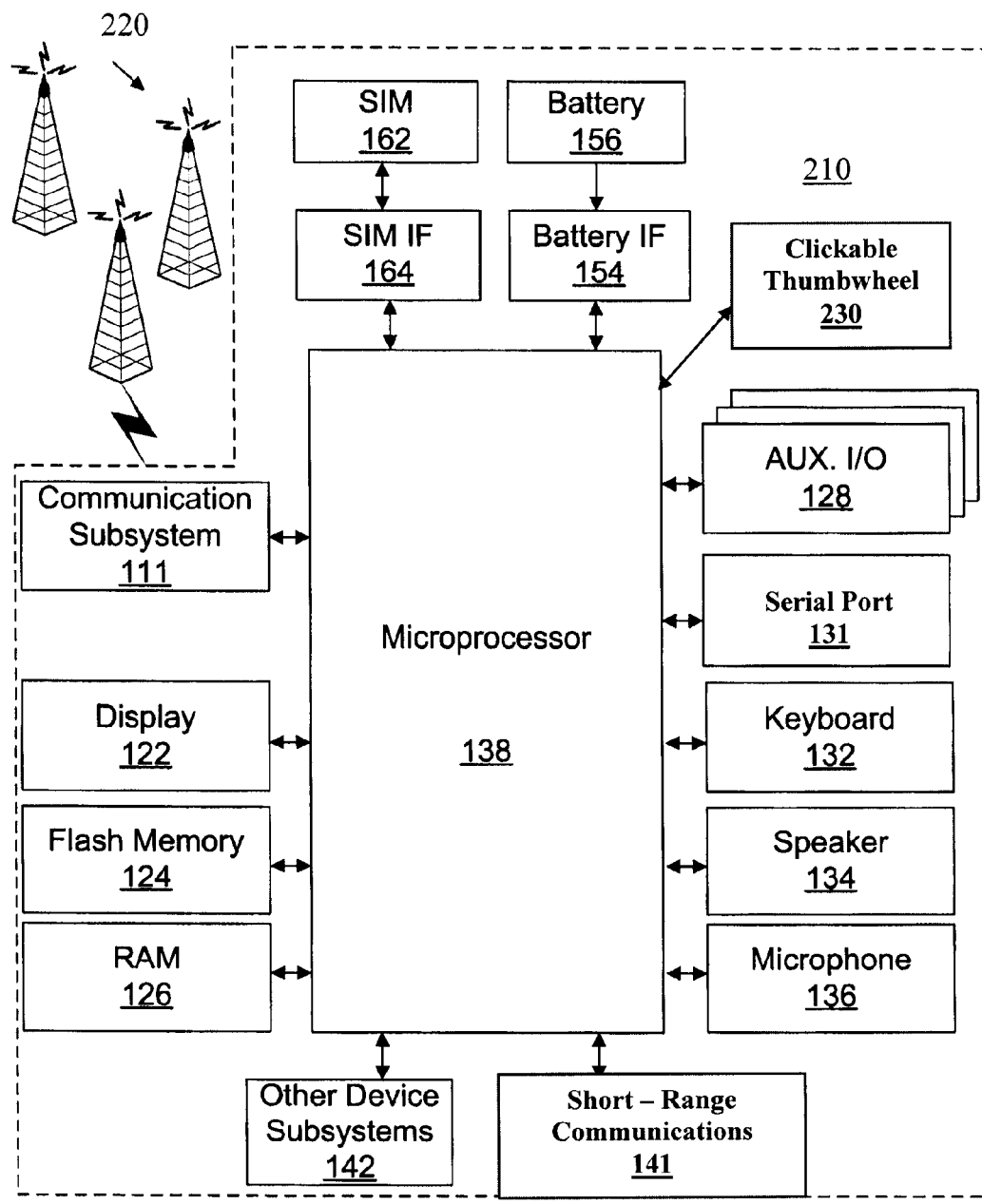
FIG. 2 is a block diagram illustrating a wireless device and a wireless communications system adapted for implementing an embodiment of the invention.

FIG. 2 is a block diagram illustrating a wireless device 210 and a wireless network 220 adapted for implementing an embodiment of the invention. The wireless network 220 includes antenna, base stations, and supporting radio equipment, known to those of ordinary skill in the art, for supporting wireless communications between the wireless device 210 and the data processing system 100. The wireless network 220 may be coupled to a wireless network gateway (not shown) and to a wide area network (not shown) to which the data processing system 100 may be coupled through its interface 150.

The wireless device 210 is a two-way communication device having at least voice and advanced data communication capabilities, including the capability to communicate with other computer systems 100. Depending on the functionality provided by the device 210, it may be referred to as a data messaging device, a two-way pager, a cellular telephone with data messaging capabilities, a wireless Internet appliance, or a data communication device (with or without telephony capabilities). The device 210 may communicate with any one of a plurality of fixed transceiver stations 220 within its geographic coverage area.

The wireless device 210 will normally incorporate a communication subsystem 111, which includes a RF receiver, a RF transmitter, and associated components, such as one or more (preferably embedded or internal) antenna elements, local oscillators ("LOs"), and a processing module such as a digital signal processor ("DSP") (all not shown). As will be apparent to those skilled in the field of communications, the particular design of the communication subsystem 111 depends on the communication network 220 in which the device 210 is intended to operate.

Network access is associated with a subscriber or user of the device 210 and therefore the device 210 typically has a Subscriber Identity Module (or "SIM" card) 162 to be inserted in a SIM interface ("IF") 164 in order to operate on the network (e.g., a GSM network). The device 210 is a battery-powered device so it also includes a battery IF 154 for receiving one or more rechargeable batteries 156. Such a battery 156 provides electrical power to most if not all electrical circuitry in the device 210, and the battery IF 154 provides for a mechanical and electrical connection for it. The battery IF 154 is coupled to a regulator (not shown) which provides power to the circuitry of the device 210.

The wireless device 210 includes a microprocessor 138 which controls overall operation of the device 210. Communication functions, including at least data and voice communications, are performed through the communication subsystem 111. The microprocessor 138 also interacts with additional device subsystems such as a display 122, a flash memory 124 or other persistent store, a random access memory ("RAM") 126, auxiliary input/output ("I/O") subsystems 128, a serial port 131, a keyboard 132, a clickable thumbwheel 230, a speaker 134, a microphone 136, a short-range communications subsystem 141, and any other device subsystems generally designated at 142. Some of the subsystems shown in FIG. 2 perform communication-related functions, whereas other subsystems may provide "resident" or on-device functions. Notably, some subsystems, such as the keyboard 132, display 122, and clickable thumbwheel 230, for example, may be used for both communication-related functions, such as entering a text message for transmission over a communication network, and device-resident functions such as a calculator or task list. Operating system software used by the microprocessor 138 is preferably stored in a persistent store such as the flash memory 124, which may alternatively be a read-only memory ("ROM") or similar storage element (not shown). Those skilled in the art will appreciate that the operating system, specific device applications, or parts thereof, may be temporarily loaded into a volatile store such as RAM 126.

The microprocessor 138, in addition to its operating system functions, preferably enables execution of software applications on the device 210. A predetermined set of applications which control basic device operations, including at least data and voice communication applications, will normally be installed on the device 210 during its manufacture. A preferred application that may be loaded onto the device 210 may be a personal information manager ("PIM") application having the ability to organize and manage data items relating to the user such as, but not limited to, instant messaging ("IM"), email, calendar events, voice mails, appointments, and task items. Naturally, one or more memory stores are available on the device 210 and SIM 162 to facilitate storage of PIM data items and other information.

The PIM application preferably has the ability to send and receive data items via the wireless network 220. In a preferred embodiment, PIM data items are seamlessly integrated, synchronized, and updated via the wireless network, with the wireless device user's corresponding data items stored and/or associated with a host computer system such as the data processing system 100 thereby creating a mirrored host computer on the device 210 with respect to such items. This is especially advantageous where the host computer system is the wireless device user's office computer system. Additional applications may also be loaded onto the device 210 through the network 220, the auxiliary I/O subsystem 128, the serial port 131, the short-range communications subsystem 141, or any other suitable subsystem 142, and installed by a user in RAM 126 or preferably in a non-volatile store (not shown) for execution by the microprocessor 138. Such flexibility in application installation increases the functionality of the device 210 and may provide enhanced on-device functions, communication-related functions, or both. For example, secure communication applications may enable electronic commerce functions and other such financial transactions to be performed using the wireless device 210.

In a data communication mode, a received signal such as a text message, an email message, or web page download will be processed by the communication subsystem 111 and input to the microprocessor 138. The microprocessor 138 will preferably further process the signal for output to the display 122 and/or to the auxiliary I/O device 128. A user of the wireless device 210 may also compose data items, such as email messages, for example, using the keyboard 132 in conjunction with the display 122, the clickable thumbwheel 230, and possibly the auxiliary I/O device 128. The keyboard 132 is preferably a complete alphanumeric keyboard and/or a telephone-type keypad. These composed items may be transmitted over a communication network 220 through the communication subsystem 111 or the short range communication subsystem 141.

For voice communications, the overall operation of the wireless device 210 is substantially similar, except that the received signals would be output to the speaker 134 and signals for transmission would be generated by the microphone 136. Alternative voice or audio I/O subsystems, such as a voice message recording subsystem, may also be implemented on the device 210. Although voice or audio signal output is preferably accomplished primarily through the speaker 134, the display 122 may also be used to provide, for example, an indication of the identity of a calling party, duration of a voice call, or other voice call related information.

The serial port 131 shown in FIG. 2 is normally implemented in a personal digital assistant ("PDA")-type communication device for which synchronization with a user's desktop computer is a desirable, albeit optional, component. The serial port 131 enables a user to set preferences through an external device or software application and extends the capabilities of the device 210 by providing for information or software downloads to the device 210 other than through a wireless communication network 220. The alternate download path may, for example, be used to load an encryption key onto the device 210 through a direct and thus reliable and trusted connection to thereby provide secure device communication.

The short-range communications subsystem 141 shown in FIG. 2 is an additional optional component which provides for communication between the device 210 and different systems or devices, which need not necessarily be similar devices. For example, the subsystem 141 may include an infrared device and associated circuits and components, or a Bluetooth™ communication module to provide for communication with similarly-enabled systems and devices. (Bluetooth™ is a registered trademark of Bluetooth SIG, Inc.)

Figure 3:
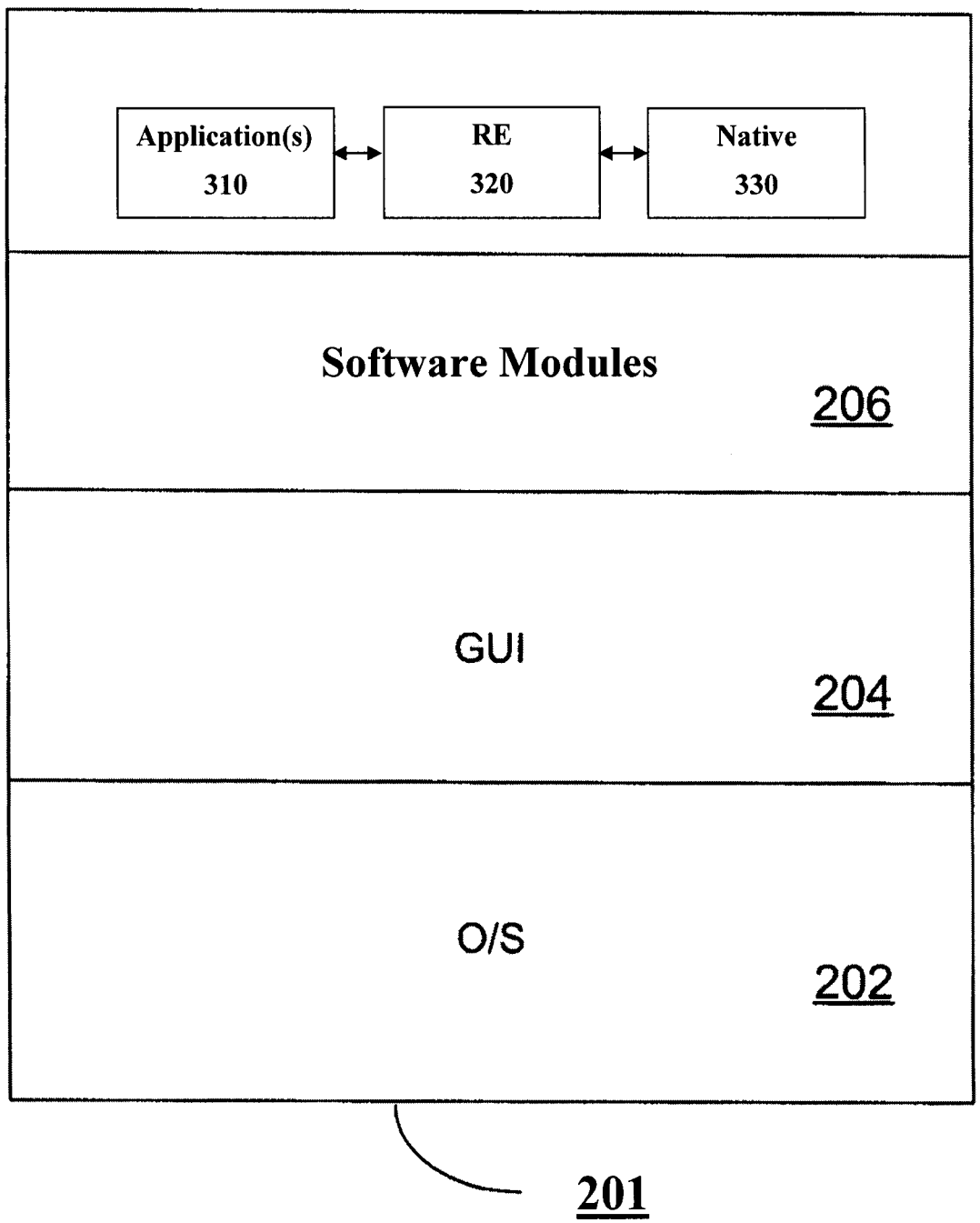
FIG. 3 is a block diagram illustrating a memory of the wireless device of FIG. 2; and, FIGS. 4 through 11 are first through eighth diagrams, respectively, illustrating the content of a byte buffer for an exemplary message in accordance with an embodiment of the invention.

FIG. 3 is a block diagram illustrating a memory 201 of the wireless device 210 of FIG. 2. The memory 201 has various software components for controlling the device 210 and may include flash memory 124, RAM 126, or ROM (not shown), for example. In accordance with an embodiment of the invention, the wireless device 210 is intended to be a multi-tasking wireless communications device configured for sending and receiving data items and for making and receiving voice calls. To provide a user-friendly environment to control the operation of the device 210, an operating system ("O/S") 202 resident on the device 210 provides a basic set of operations for supporting various applications typically operable through a graphical user interface ("GUI") 204. For example, the O/S 202 provides basic input/output system features to obtain input from the auxiliary I/O 128, the keyboard 132, the clickable thumbwheel 230, and the like, and for facilitating output to the user. Though not shown, one or more applications for managing communications or for providing personal digital assistant like functions may also be included. In accordance with an embodiment of the invention, there are provided software modules 206 for reducing the size of messages communicated between wireless and other devices as will be described below.

Thus, the wireless device 210 includes computer executable programmed instructions for directing the device 210 to implement the embodiments of the present invention. The programmed instructions may be embodied in one or more software modules 206 resident in the memory 201 of the wireless device 210. Alternatively, the programmed instructions may be embodied on a computer readable medium (such as a CD disk or floppy disk) which may be used for transporting the programmed instructions to the memory of the wireless device 210. Alternatively, the programmed instructions may be embedded in a computer-readable, signal-bearing medium that is uploaded to a network by a vendor or supplier of the programmed instructions, and this signal-bearing medium may be downloaded through an interface 111, 131, 141 to the wireless device 210 from the network by end users or potential buyers.

According to one embodiment of the invention, as shown in FIG. 3, the software modules 206 are designed on a layered model, in which one or more wireless applications 310 control the user's experience of the wireless device 210, and a runtime environment ("RE") 320 translates between the application software 310 and a native machine-language 330 of the wireless device 210 to control the hardware of the wireless device, to communicate with data services, etc. The applications 310 may be transmitted or downloaded to the wireless device 210 by the data processing system 100 over the wireless network 220. Typically, the applications 310 contain application logic in the form of XML or Java™ script (i.e., ECMA script) and application data, and the RE 320 includes a script interpreter (not shown).

For reference, the term "runtime" refers to that time when an application or program is running (or being executable). That is, when a program starts running in a computer, it is runtime for that program. In some programming languages, certain reusable programs or routines are built and packaged as a runtime library. These routines can be linked to and used by any program when it is running. Thus, the term "runtime environment" refers to the collection of routines, variables, etc., that provide commonly used functions, services, data, etc., for a program while it is running.

Now, the present invention provides a system and method for reducing the size of messages communicated between wireless and other devices.

According to one embodiment of the invention, there is provided a method for optional field encoding. Certain message fields of primitive type (includes string type) can have default values known to both sender (e.g., data processing system or server 100) and receiver (e.g., wireless device 210). These fields are thus optional and need not be written into the message if the sender can indicate to the receiver that no custom value has been sent and the default value should be used. This can reduce the size of the message.

The optional field encoding method of the present invention reserves a byte in the message, as the need arises, for marking these optional fields as custom or default. This byte can represent up to a maximum of 8 optional fields, with a 1-bit slot per field. If the default value is to be used, the slot is turned on (i.e., bit value=1), otherwise the slot is turned off (or vice versa) and the custom value is written into the message. When all 8 slots are used up, the next optional field results in a new byte (i.e., the current byte) being reserved.

For example, consider an exemplary message having the following definition:

```
{message}
{field name="field1__int" type=int /}
{field name="field2__int" type=int default=3 /}
{field name="field3__boolean" type=boolean default=false /}
{field name="field4__string" type=string default="janedoe"/}
{field name="field5__int" type=int default=4 /}
{field name="field6__string"type=string default="johndoe"/}
{field name="field7__int" type=int default=5 /}
{field name="field8__long" type=long /}
{field name="field9__double" type=double default=1.0 /}
{field name="field10__int" type=int default=7 /}
{field name="field11__boolean" type=boolean /}
{field name="field12__char" type=char default='a' /}
{/message}
```

Now assume that the sender wishes to send the above message with the following field values:

```
field1__int = 12
field2__int = 20
```

-continued

```
field3__boolean = false
field4__string = "janedoe"
field5__int = 4
field6__string = "johndoe"
field7__int = 5
field8__long = 72233720368554775805
field9__double = 1.0
field10__int = 25
field11__boolean = true
field12__char = 'b'
```

The method for serializing this message into a byte buffer is illustrated in FIGS. 4-11. For clarity, compacting is not taken into account in the following description. The data types identified in the above example (e.g., "type=int") occupy the following number of bytes in the byte buffer:

| Data Type | Number of Bytes |
| --- | --- |
| boolean | 1 |
| char | 1 |
| int | 4 |
| long | 8 |
| double | 8 |
| string | determined by value of string |

Three variables are associated with the method. The "cursor" variable is the current position within the byte buffer 400 (see FIG. 4). The "optionalFieldMarkerCursor" variable is the position within the byte buffer 400 (see FIG. 5) of a reserved optional field marker byte 500. And, the "optionalFieldMarkerBitOffset" variable is the current position within the reserved byte 500. Note that the cursor and optionalFieldMarkerBitOffset variables start at position "0" in the byte buffer 400 and reserved byte 500, respectively. Therefore, "cursor=0" refers to the first byte in the byte buffer 400 and "optionalFieldMarkerBitOffset=0" refers to the first bit in the reserved byte 500. The following are initial values for the variables associated with the method:

```
optionalFieldMarkerCursor = <undefined>
optionalFieldMarkerBitOffset = 0
cursor = 0
```

In addition, the following definitions will apply below. The expression "optional field" refers to a field with a predefined value which may or not may not be overwritten by the sender. The expression "optional field with a default value" satisfies these conditions: (i) the field has a predefined value; and, (ii) the value set by the sender is equal to the predefined value. And, the expression "optional field with a custom value" satisfies these conditions: (i) the field has a predefined value; and, (ii) the value set by the sender is not equal to the predefined value.

Figure 4:
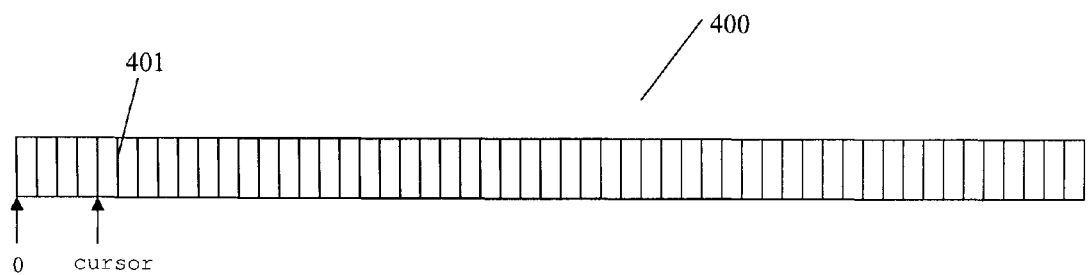

FIG. 4 is a first diagram illustrating the content of a byte buffer 400 for the exemplary message in accordance with an embodiment of the invention. At step 1, field 1 is written to the byte buffer 400. Note that field 1 is not a optional field (i.e., "type=int" and "field1_int=12") and so the value of the field is written to the byte buffer 400 and occupies 4 bytes (i.e., data bytes 401) in the buffer 400 as field 1 is of type "int" (see the table above showing data type versus byte number). Accordingly, the cursor is incremented by 4. The optionalField- MarkerCursor and optionalFieldMarkerBitOffset remain unchanged at their initial values. The variables have the following values:

```
optionalFieldMarkerCursor = <undefined>
optionalFieldMarkerBitOffset = 0
cursor = 4
```

Figure 5:
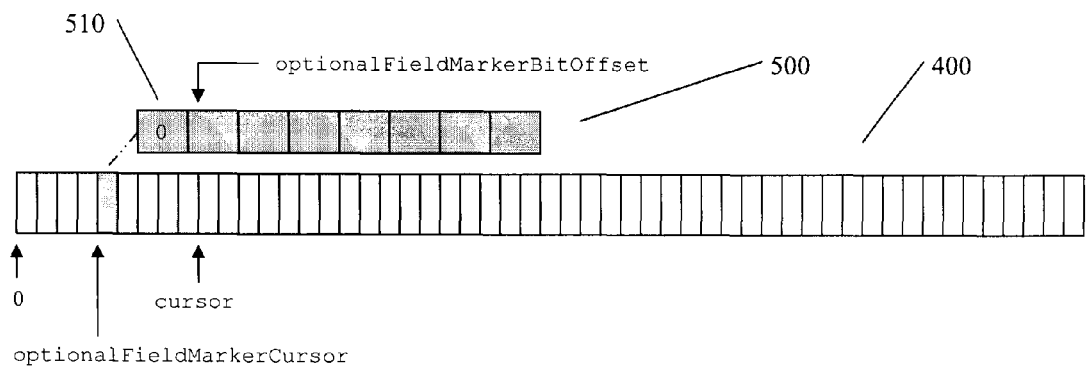

FIG. 5 is a second diagram illustrating the content of the byte buffer 400 for the exemplary message in accordance with an embodiment of the invention. At step 2, field 2 is written to the byte buffer 400. Note that field 2 is a optional field with a custom value (i.e., "type=int default=3" and "field2_int=20"). The first bit 510 of the reserved optional field byte 500 is marked with a "0" (i.e., reset) to indicate a custom value and the custom value (i.e., "20") is written to the byte buffer 400. Thus, a reserved byte 500 is introduced and inserted into the byte buffer 400 for the optional field. Accordingly, the cursor is incremented by 5 (i.e., 1 for the reserved byte 500 and 4 for the custom integer value "20"). The optionalFieldMarkerCursor is set at the position in the byte buffer 400 of the reserved byte 500, at 4 here, which was the value of the cursor before this step. And, the optionalFieldMarkerBitOffset is incremented by 1 to reflect the resetting of the first bit 510 of the reserved byte 500 upon encountering the optional field with a custom value in the message. The variables have the following values:

```
optionalFieldMarkerCursor = 4
optionalFieldMarkerBitOffset = 1
cursor = 9
```

Figure 6:
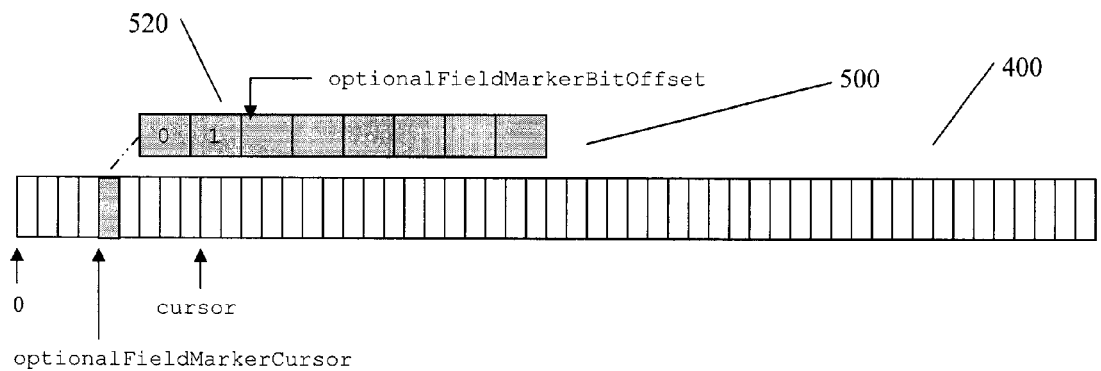

FIG. 6 is a third diagram illustrating the content of the byte buffer 400 for the exemplary message in accordance with an embodiment of the invention. At step 3, field 3 is written to the byte buffer 400. Note that field 3 is a optional field with a default value (i.e., "type=boolean default=false" and "field3_boolean=false"). The second bit 520 of the reserved optional field byte 500 is marked with a "1" (i.e., set) to indicate a default value. Note that the default value is not written to the byte buffer 400. Accordingly, the cursor is not incremented. The optionalFieldMarkerCursor remains set at the position in the byte buffer 400 of the reserved byte 500 as there are 6 remaining bits in the reserved byte 500. And, the optionalFieldMarkerBitOffset is incremented by 1 to reflect the setting of the second bit 520 of the reserved byte 500 upon encountering a optional field with a default value in the message. The variables have the following values:

```
optionalFieldMarkerCursor = 4
optionalFieldMarkerBitOffset = 2
cursor = 9
```

Figure 7:
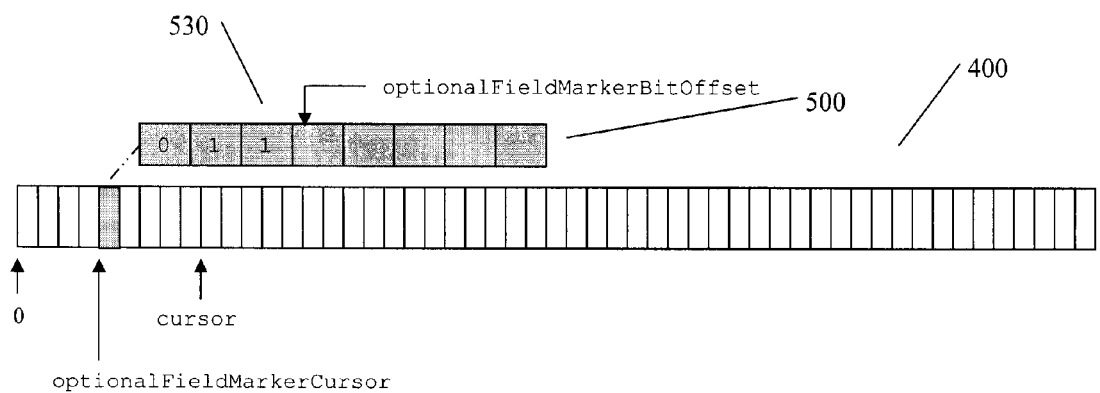

FIG. 7 is a fourth diagram illustrating the content of the byte buffer 400 for the exemplary message in accordance with an embodiment of the invention. At step 4, field 4 is written to the byte buffer 400. Note that field 4 is a optional field with a default value (i.e., "type=string default='janedoe'" and "field4_string='janedoe'"). The third bit 530 of the reserved byte 500 is set accordingly. The variables have the following values:

```
optionalFieldMarkerCursor = 4
optionalFieldMarkerBitOffset = 3
cursor = 9
```

At step 5, field 5 is written to the byte buffer 400. Note that field 5 is a optional field with a default value (i.e., "type=int default=4" and "field5_int=4"). The fourth bit 540 of the reserved byte 500 is set accordingly (see FIG. 8).

At step 6, field 6 is written to the byte buffer 400. Note that field 6 is a optional field with a default value (i.e., "type=string default='johndoe'" and "field6_string='johndoe'"). The fifth bit 550 of the reserved byte 500 is set accordingly (see FIG. 8).

At step 7, field 7 is written to the byte buffer. Note that field 7 is a optional field with a default value (i.e., "type=int default=5" and "field7_int=5"). The sixth bit 560 of the reserved byte 500 is set accordingly (see FIG. 8).

After steps 5, 6, and 7, the variables have the following values:

```
optionalFieldMarkerCursor = 4
optionalFieldMarkerBitOffset = 6
cursor = 9
```

Figure 8:
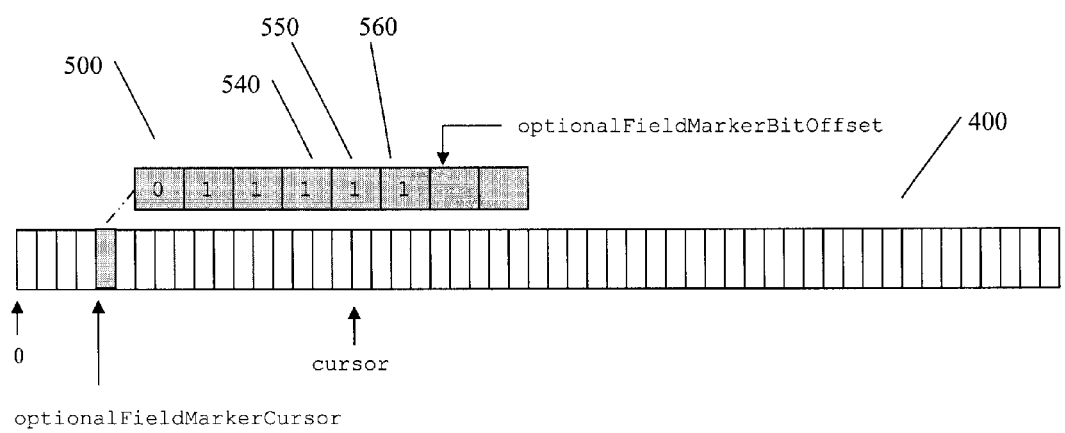

FIG. 8 is a fifth diagram illustrating the content of the byte buffer 400 for the exemplary message in accordance with an embodiment of the invention. At step 8, field 8 is written to the byte buffer 400. Note that field 8 is not a optional field (i.e., "type=long" and "field8_long=7223372036854775805") and so the value of the field is written to the byte buffer 400 and occupies 8 bytes in the buffer 400 as field 8 is of type "long" (see the table above showing data type versus byte number). Accordingly, the cursor is incremented by 8. The optionalFieldMarkerCursor and optionalFieldMarkerBitOffset remain unchanged at their previous values. The variables have the following values:

```
optionalFieldMarkerCursor = 4
optionalFieldMarkerBitOffset = 6
cursor = 17
```

At step 9, field 9 is written to the byte buffer 400. Note that field 9 is a optional field with a default value (i.e., "type=double default=1.0" and "field9_double=1.0"). The seventh bit 570 of the reserved byte 500 is set accordingly (see FIG. 9). The variables have the following values:

```
optionalFieldMarkerCursor = 4
optionalFieldMarkerBitOffset = 7
cursor = 17
```

Figure 9:
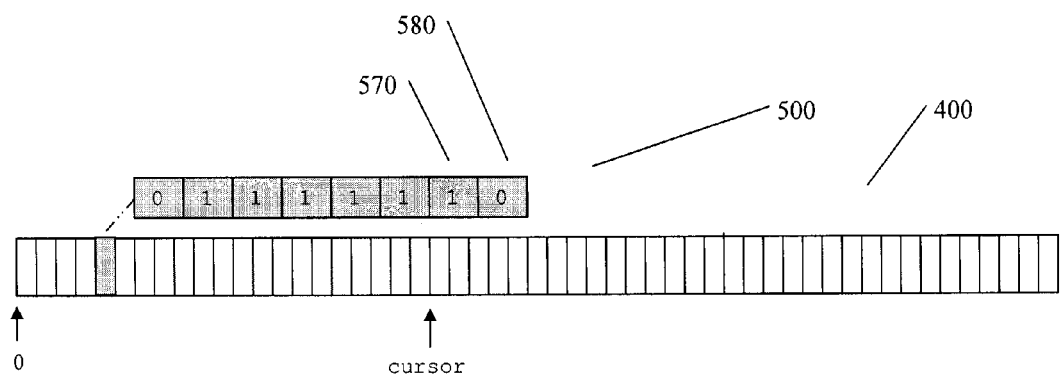

FIG. 9 is a sixth diagram illustrating the content of the byte buffer 400 for the exemplary message in accordance with an embodiment of the invention. At step 10, field 10 is written to the byte buffer 400. Note that field 10 is a optional field with a custom value (i.e., "type=int default=7" and "field10_int=25"). The eighth bit 580 of the reserved byte 500 is reset to indicate a custom value and the custom value (i.e., "25") is written to the byte buffer 400. Accordingly, the cursor is incremented by 4 (i.e., for the custom integer). The optionalFieldMarkerCursor becomes undefined as the eight bits in the first reserved byte 500 are now full. And, the optionalFieldMarkerBitOffset is incremented by 1 to 0 (i.e., it counts 8 from 0 to 7) to reflect the resetting of the eighth bit 580 of the reserved byte 500 upon encountering a optional field with a custom value in the message. The variables have the following values:

```
optionalFieldMarkerCursor = <undefined>
optionalFieldMarkerBitOffset = 0
cursor = 21
```

Figure 10:
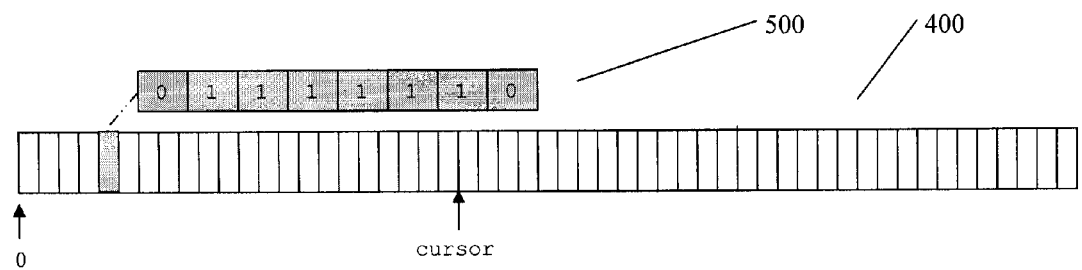

FIG. 10 is a seventh diagram illustrating the content of the byte buffer 400 for the exemplary message in accordance with an embodiment of the invention. At step 11, field 11 is written to the byte buffer. Note that field 11 is not a optional field (i.e., "type=boolean" and "field11_boolean=true") and so the value of the field is written to the byte buffer 400 and occupies 1 byte in the buffer 400 as field 11 is of type "boolean" (see the table above showing data type versus byte number). Accordingly, the cursor is incremented by 1. The optionalFieldMarkerCursor and optionalFieldMarkerBitOffset remain unchanged at their previous values. The variables have the following values:

```
optionalFieldMarkerCursor = <undefined>
optionalFieldMarkerBitOffset = 0
cursor = 22
```

Figure 11:
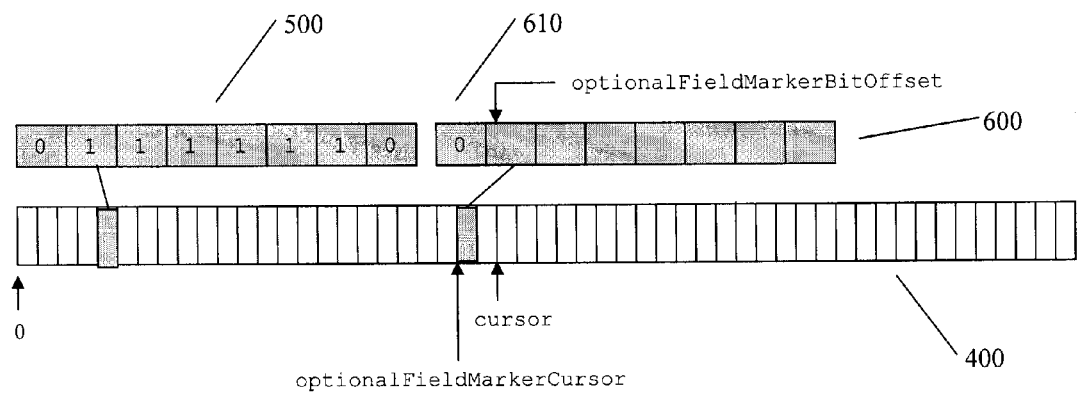

FIG. 11 is an eighth diagram illustrating the content of the byte buffer 400 for the exemplary message in accordance with an embodiment of the invention. At step 12, field 12 is written to the byte buffer. Note that field 12 is a optional field with a custom value (i.e., "type=char default='a'" and "field12_char='b'"). As the first reserved optional field byte 500 is full, the first bit 610 of a second reserved optional field byte 600 is marked with a "0" (i.e., reset) to indicate a custom value and the custom value (i.e., "b") is written to the byte buffer 400. Thus, a new second reserved byte 600 is introduced and inserted in the byte buffer 400 for the optional field. Accordingly, the cursor is incremented by 2 (i.e., 1 for the second reserved byte 600 and 1 for the custom character value "b"). The optionalFieldMarkerCursor is set at the position in the byte buffer 400 of the second reserved byte 600, at 22 here, which was the value of the cursor before this step. And, the optionalFieldMarkerBitOffset is incremented by 1 to reflect the resetting of the first bit 610 of the second reserved byte 600 upon encountering a optional field with a custom value in the message. The variables have the following values:

```
optionalFieldMarkerCursor = 22
optionalFieldMarkerBitOffset = 1
cursor = 24
```

Thus, according to the present invention, the optional field bytes 500, 600 are embedded in the byte buffer 400 between data bytes 401 and are created as needed. Advantageously, the use of optional field markers results in byte savings when custom values for optional fields are not used.

In operation, the writer (e.g., data processing system or server 100) and reader (e.g., wireless device 210) use the same message definition for any given message and thus write and read fields in exactly the same order. When the reader is about to read a optional field, a message decoding protocol 206 detects the presence of a "optionalFieldMarker" byte 500, 600. The protocol 206 will check the 1-bit slot (e.g., 510) within this byte (e.g., 500) allocated to the field (e.g., field 2) being read. From the value of the bit (1 or 0), it will be able to determine if a custom value (e.g., "20" for field 2) should be read from the message, or if no custom value has been written and the default value (e.g., "3" for field 2) should be used.

According to another embodiment of the invention, there is provided a method for null field encoding. In communications between wireless and other devices, a message may include null complex object, string, and array fields. Allowing null fields adds flexibility to the messaging protocol and is especially useful when messages contain complex objects.

With respect to null object fields, the above described optional field encoding method can be extended to indicate components as null or non-null. When a complex object is to be encoded, an "ObjectFieldMarkerByte" with 1-bit slots per object field, similar to the reserved byte 500, 600 used for optional fields, can be reserved for marking objects as null or non-null. Basically, object fields can be thought of as optional fields with a default value of "null".

For example, consider the following definition of a exemplary complex data object and related message:

```
{data name="Data1"}
    {field name="field1__int" type=int /}
    {field name="field2__boolean" type=boolean /}
{/data}
{message}
    {field name="field1__object" type=Data1 /}
{/message}
```

If the "Data1" object to be encoded in the above message is null, a byte (i.e., the current byte pointed to by the cursor) in the byte buffer 400 will be reserved for marking objects. Each such reserved byte can represent up to a maximum of 8 objects fields (i.e., the reserved byte has 8 bits). A value of 0 in the 1-bit marker slot of the reserved byte can indicate null, and a value of 1 can indicate non-null, or vice versa.

According to another embodiment of the invention, the marking of optional fields and object fields can also be combined to share use of the same "FieldMarkerByte". Each field marking byte may be considered as eight 1-bit slots that can be marked as 1 or 0. When writing, the encoding protocol 170 uses these slots as required for marking whatever fields it encounters (i.e., any field determined to require a marker-slot such as optional and object fields). Later, when reading, the decoding protocol 206 will collect these slots in order as the reader 210 reads the fields (in order). The decoding protocol is a mirror image of the encoding protocol and is aware if a field (i.e., a optional or an object field) has a marker-slot associated with it. The marking (i.e., 1 or 0) has special meaning with relation to the current field being read and is interpreted accordingly by the decoding protocol 206. So for optional fields, a marking of 1 could indicate that the field is set to its default value. On the other hand, for object fields, a marking of 1 could indicate that the field is non-null.

With respect to null string and array fields, string fields and arrays fields in the byte encoding of a message are preceded by their length. Null string and array lengths are encoded with the value 0. Non-null string and array lengths are incremented by 1 on encoding and decremented by 1 on decoding.

The above described method is generally performed by the data processing system 100. However, according to an alternate embodiment of the invention, the method can be performed by the wireless device 210.

While this invention is primarily discussed as a method, a person of ordinary skill in the art will understand that the apparatus discussed above with reference to a wireless device 210 and a data processing system 100, may be programmed to enable the practice of the method of the invention. Moreover, an article of manufacture for use with a wireless device 210 or data processing system 100, such as a pre-recorded storage device or other similar computer readable medium including program instructions recorded thereon, may direct the wireless device 210 or data processing system 100 to facilitate the practice of the method of the invention. It is understood that such apparatus and articles of manufacture also come within the scope of the invention.

The embodiments of the invention described above are intended to be exemplary only. The scope of the invention is therefore intended to be limited solely by the scope of the appended claims.

What is claimed is:

1. A method for encoding a message communicated between a sender device and a receiver device, the message having at least one field for conveying predefined data fields and non-predefined data fields, the method comprising:
   inserting at the sender a reserve byte into a byte buffer for identifying the predefined data fields to be conveyed by the message, the reserve byte generated by:
      mapping each bit position of the reserve byte to one of the predefined data fields in the message;
      assigning a binary value to each bit position in the reserve byte based upon a value to be conveyed by the message in an associated predefined data field comprising:
         marking the bit position in the reserve byte associated with the predefined data field to indicate that a default value is to be conveyed by the message wherein the value is not stored in the byte buffer; and
         marking the bit position in the reserve byte associated with the predefined data field to indicate that a custom value is being conveyed in the associated predefined field position and inserting the custom value in the byte buffer;
   inserting into the byte buffer non-predefined data fields, wherein the non-predefined fields are not mapped to a bit position of the reserve byte,
   wherein the receiver can decode the message by extracting non-predefined fields and by determining from the reserve byte if known predefined values are to be used or if the custom value is to be extracted from the predefined data field in the message.

2. The method of claim 1, further comprising inserting the reserved byte into the byte buffer upon first encountering a field in the message that contains a predefined data field.

3. The method of claim 1, further comprising, if the reserved byte is full, inserting a next reserved byte into the byte buffer.

4. The method of claim 3, further comprising maintaining a counter for bits in the reserved byte to determine if the reserved byte is full and incrementing the counter when a bit is marked.

5. The method of claim 1, further comprising, if the field is an object field, marking a bit in the reserved byte in the byte buffer to indicate that the object field is either null or non-null.

6. The method of claim 1 wherein the default value is marked by a binary value of 1 and the custom value is indicated by a binary value of 0.

7. The method of claim 1 wherein the default value is marked by a binary value of 0 and the custom value is indicated by a binary value of 1.

8. The method of claim 1, wherein the sender and receiver comprise either a wireless device and/or a data processing system, device or apparatus.

9. A system for encoding a message communicated between the system and a remote system over a network, the message having at least one field for conveying predefined data fields and non-predefined data fields, the system comprising:
   a processor coupled to memory and an interface to the network, and adapted to:
   insert at the system a reserve byte into a byte buffer for identifying the predefined data fields to be conveyed by the message, the reserve byte generated by:
      mapping each bit position of the reserve byte to one of the predefined data fields in the message;
      assigning a binary value to each bit position in the reserve byte based upon a value to be conveyed by the message in an associated predefined data field comprising:
         marking the bit position in the reserve byte associated with the predefined data field to indicate that a default value is to be conveyed by the message wherein the value is not stored in the byte buffer; and
         marking the bit position in the reserve byte associated with the predefined data field to indicate that a custom value is being conveyed in the associated predefined field position and inserting the custom value in the byte buffer;
   insert into the byte buffer non-predefined data fields, wherein the non-predefined fields are not mapped to a bit position of the reserve byte,
   wherein the remote system can decode the message by extracting non-predefined fields and by determining from the reserve byte if known predefined values are to be used or if the custom value is to be extracted from the predefined data field in the message.

10. The system of claim 9, wherein the processor is further adapted to insert the reserved byte into the byte buffer upon first encountering a field in the message that contains a predefined data field.

11. The system of claim 9, wherein the processor is further adapted to, if the reserved byte is full, insert a next reserved byte into the byte buffer.

12. The system of claim 11, wherein the processor is further adapted to maintain a counter for bits in the reserved byte to determine if the reserved byte is full and to increment the counter when a bit is marked.

13. The system of claim 9, wherein the processor is further adapted to, if the field is an object field, mark a bit in the reserved byte in the byte buffer to indicate that the object field is one of null and non-null.

14. The system of claim 9 wherein the default value is marked by a binary value of 1 and the custom value is indicated by a binary value of 0.

15. The system of claim 9 wherein the default value is marked by a binary value of 0 and the custom value is indicated by a binary value of 1.

16. The system of claim 9, wherein the system and the remote system each comprise one of a wireless device and a data processing system, device or apparatus.

17. A computer program product having a computer readable medium tangibly embodying computer executable code for directing a system to encode a message communicated between the system and a remote system over a network, the message having at least one field, the computer program product comprising program code executable by a processor of a data processing device, system or apparatus for:

inserting at the sender a reserve byte into a byte buffer for identifying the predefined data fields to be conveyed by the message, the reserve byte generated by:

mapping each bit position of the reserve byte to one of the predefined data fields in the message;

assigning a binary value to each bit position in the reserve byte based upon a value to be conveyed by the message in an associated predefined data field comprising:

marking the bit position in the reserve byte associated with the predefined data field to indicate that a default value is to be conveyed by the message wherein the value is not stored in the byte buffer; and marking the bit position in the reserve byte associated with the predefined data field to indicate that a custom value is being conveyed in the associated predefined field position and inserting the custom value in the byte buffer;

inserting into the byte buffer non-predefined data fields, wherein the non-predefined fields are not mapped to a bit position of the reserve byte, wherein the receiver can decode the message by extracting non-predefined fields and by determining from the reserve byte if known predefined values are to be used or if the custom value is to be extracted from the predefined data field in the message.

\* \* \* \* \*